United States Patent [19]

Jarvis

[11] Patent Number: 4,482,020

[45] Date of Patent: Nov. 13, 1984

[54] AGRICULTURAL SHARE FORMED IN TWO MIRROR IMAGE PARTS

[76] Inventor: H. Frank Jarvis, 21 Fermaner St., Karrinyup, Australia, 6018

[21] Appl. No.: 473,646

[22] Filed: Mar. 9, 1983

[30] Foreign Application Priority Data

Mar. 10, 1982 [AU] Australia .............................. PF3049

[51] Int. Cl.³ ........................ A01B 15/04; A01B 39/22
[52] U.S. Cl. ................................... 172/726; 172/745; 172/747
[58] Field of Search ............... 172/721, 725, 726, 724, 172/730, 745, 747, 769, 719

[56] References Cited

U.S. PATENT DOCUMENTS

| 292,448 | 1/1884 | Swift | 172/725 |
|---|---|---|---|
| 1,010,276 | 11/1911 | Letherman | 172/721 |
| 1,120,227 | 12/1914 | Mustard | 172/725 |
| 2,033,594 | 3/1936 | Stoody | 172/747 X |
| 3,005,502 | 10/1961 | Teal | 172/726 |
| 4,185,699 | 1/1980 | Lewison | 172/724 |

FOREIGN PATENT DOCUMENTS

| 11422 | 3/1934 | Australia | 172/721 |
|---|---|---|---|
| Ad.22702 | 2/1921 | France | 172/726 |

*Primary Examiner*—Richard T. Stouffer
*Attorney, Agent, or Firm*—Dennison, Meserole, Pollack & Scheiner

[57] ABSTRACT

An agricultural share formed in two parts wherein the parts are mirror images of one another and each part comprises a major face having a point, the face being defined by a first, inner edge extending rearwardly from the point and a second, outer edge extending rearwardly from the point and diverging at an acute angle away from the first edge, an upstanding flange disposed at an angle greater than 90° to the major face, extending along at least part of the first edge and extending forwardly at least as far as the point, the parts being joined together along their inner edges by mating of the flanges to form a raised ridge.

12 Claims, 7 Drawing Figures

AGRICULTURAL SHARE FORMED IN TWO MIRROR IMAGE PARTS

The present invention relates to agricultural shares. Agricultural shares typically comprise a point and leading edges extending rearwardly from the point. The shares are usually made from metal which may be a single piece of metal. The metal may be heated to enable it to be formed to a particular desired curved shape in a press or the like. However, the need for forming the metal into a curved shape places limitations on the hardness of the metal which can be used. This is because the pressing machinery used in the forming process typically has only sufficient power to press metal having a Rockwell C hardness of about 32–35. Also, when shares are formed from a single piece of metal it is difficult to provide adequate protection for a mounting bolt which is used to affix the share to a tyne of an agricultural implement.

In accordance with the present invention there is provided an agricultural share formed in two parts wherein said parts are mirror images of one another and each part comprises a major face having a point, said face being defined by a first, inner edge extending rearwardly from the point and a second, outer edge extending rearwardly from the point and diverging at an acute angle away from the first edge, an upstanding flange disposed at an angle greater than 90° to the major face, extending along at least part of the first edge and extending forwardly at least as far as the point, said parts being joined together along their inner edges by mating of the flanges and by application of an appropriate joining means to the flanges to form a ridge.

The agricultural share of the present invention is formed from two preformed parts wherein the major face can be substantially flat. The parts are joined together along the flanges. It is not essential to conduct a subsequent forming operation in a press. Thus, the share can be made of harder material having, for example, a hardness of the order of 50–60 Rockwell C, compared to conventional agricultural shares. This improves the useful life of the share considerably.

The present invention will now be described, by way of example, with reference to the accompanying drawings, in which.

Figure 1:
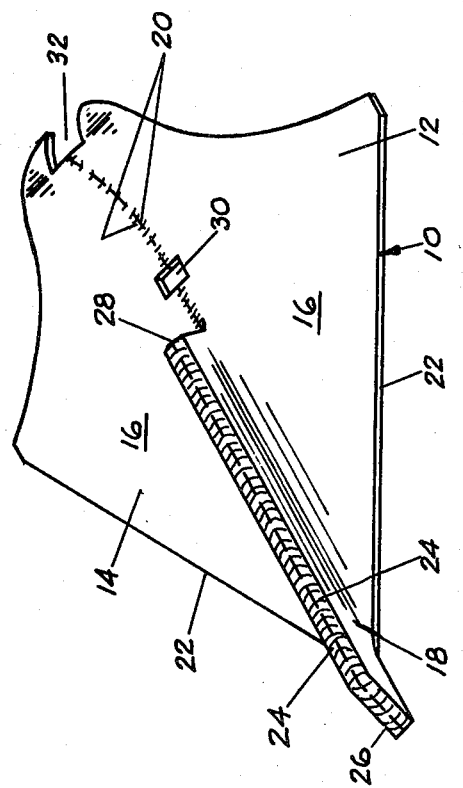
FIG. 1 is an upper perspective view from the front of an agricultural share in accordance with the present invention.
Figure 2:
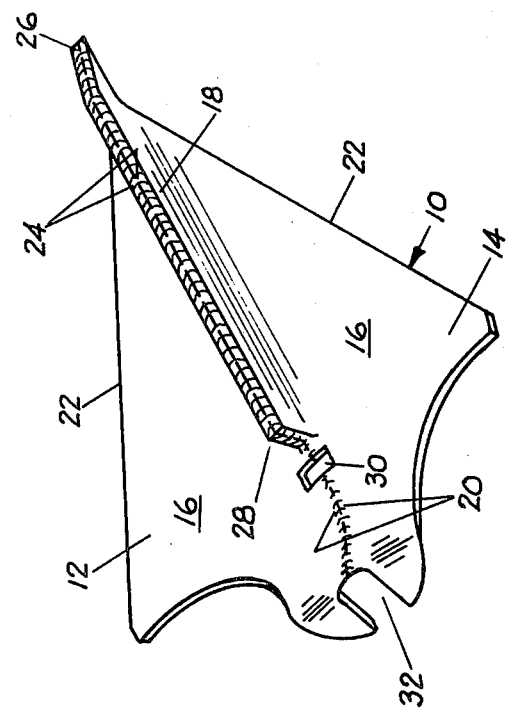
FIG. 2 is an upper perspective view from the rear of the agricultural share shown in FIG. 1.
Figure 3:
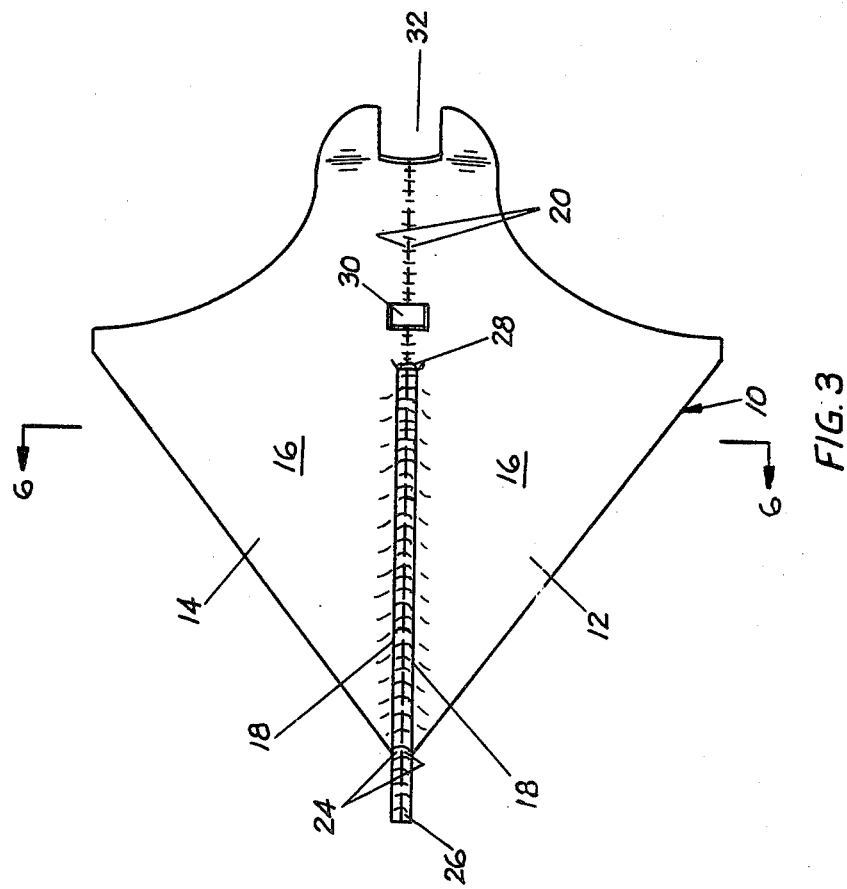
FIG. 3 is a plan view of the agricultural share shown in FIG. 1.

In FIGS. 1 to 6 of the drawings, there is shown an agricultural share 10 according to one embodiment of the present invention.

The agricultural share 10 comprises two parts 12 and 14 which are mirror images of one another. Each part 12 and 14 comprises a major face 16 having a point 18, a first, inner edge 20 extending rearwardly from the point 18 and a second, outer edge 22 extending rearwardly from the point 18 and diverging at an acute angle away from the first edge 20. An integral upstanding flange 24 extends along each first edge 20 and is disposed at an angle greater than 90° to the general plane of its major face 16.

Each flange 24 extends along the first edge 20 of its part point 12 and 14 and extends beyond the point 18 to form a forwardly projecting nose 26. As shown, the forward end of the nose 26 is preferably chamfered to give it a wedge shape. The wedge shape of the nose 26 gives the nose 26 a good cleaving action as it passes through soil in use.

The parts 12 and 14 are joined together in such a manner that the faces of the flanges 24 adjacent to the edges 20 are mated. The mating faces of the flanges 24 are joined together by any suitable means such as by welding, to form a ridge 28. Further, the upper faces of the joined flanges 24 remote from the faces 16 preferably have a layer of hard face material deposited on them for greater wear resistance. In the embodiment shown in FIGS. 1 to 6, the major faces 16 are substantially flat. This has the advantage that the major faces 16 do not have to be heated up and formed into a curved shape in a press. Thus, the hardness of the material used for the parts 12 and 14 is not limited by the need to press the parts. Thus, the metal of the agricultural share of the present invention can be relatively hard such as 50-60, e.g. 55, Rockwell C hardness. A typical material of this type is known as Bisalloy manganese type hardened steel. The hard facing on the ridge 28 formed by the flanges 24 typically has a hardness of 65 Rockwell C.

Figure 6:
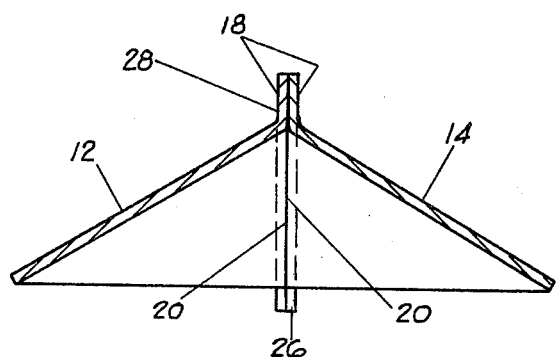
FIG. 6 is a transverse section along the line 6—6 of FIG. 3.

Further, the use of substantially flat major faces 16 gives the share 10 in transverse section a V-shape as can be seen in FIG. 6. Tynes typically have a curved mounting surface and can come in different sizes.

The V-shape enables the share 10 of the present invention to fit any tyne with a curved mounting surface regardless of size.

Whilst it is preferred to have major faces 16 which are substantially flat and thus avoid the need for pressing, it is possible to press the major faces 16 to confer on them a curved shape if desired.

The present invention still confers significant advantages if pressing is required because the ridge 28 formed by the flanges 24 protects a mounting aperture 30. The mounting aperture 30 is formed by two mating half apertures in respective parts 12 and 14 of the agricultural share 10. The aperture 30 is arranged to receive a mounting bolt which, in use, attaches the agricultural share 10 to a tyne of an agricultural implement.

Figure 4:
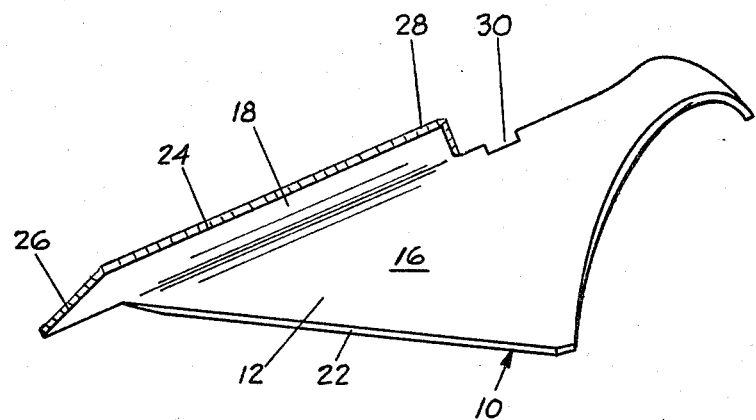
FIG. 4 is a side elevation of the agricultural share shown in FIG. 1.
Figure 5:
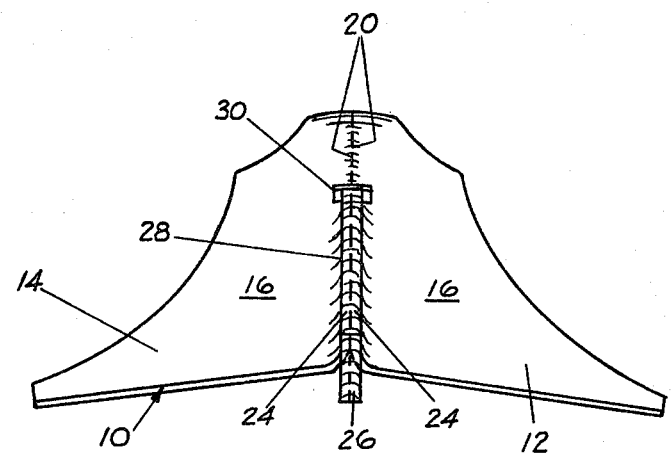
FIG. 5 is a front elevation of the agricultural share shown in FIG. 1.

As can be seen in FIG. 4, the rear ends of the major faces 16 may be curved upwardly (as shown in FIG. 4) to the rear of the aperture 30 to enable the share 10 to conform more closely to the shape of the tyne to which it is mounted, This region of the share 10 comprises a rearwardly facing aperture 32 formed from mating half apertures in the parts 12 and 14. The aperture 32 is arranged to engage with the tyne to which the share 10 is mounted to confer lateral rigidity to the mounted share 10, i.e. to prevent it twisting on the mounting bolt.

The aperture 32 is envisaged for use with larger size shares.

Figure 7:
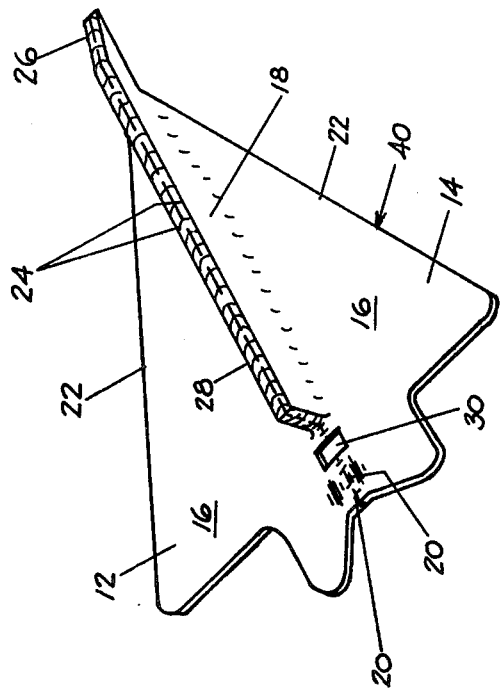
FIG. 7 is an upper perspective view from the rear of an agricultural share according to one other embodiment of the present invention.

A share 40 envisaged for use with combine seed drills is shown in FIG. 7. These shares are smaller than other shares such as are used on scarifiers and cultivators, and as shown the aperture 32 can be dispensed with. In all other respects the shares 40 are similar to the shares 10 and like reference numerals denote like parts. Further the shares of the present invention can comprise, in addition to or instead of the aperture 32, a pair of rearwardly extending flanges which extend on either side of the tyne. These flanges contain respective, aligned apertures which are arranged to be lined up with a transverse aperture in the tyne so that a pin can be passed transversely through the rearwardly extending flanges and the tyne to provide additional retaining means for the share.

The latter embodiment is particularly useful if the nose 26 is extended into a chisel point. A chisel point is useful because it can break up a clay pan beneath the surface of the soil. The breaking up of the clay pan assists in retaining moisture in the soil for longer periods. Further, the use of the chisel point aerates the soil and feeds humus into it. A narrow chisel point is preferred and with the construction of the agricultural shares of the present invention it is possible to obtain a chisel point which is narrower than conventional chisel points. If a chisel point is too wide it is found that sour soil can be turned up onto the surface.

As mentioned above, a chisel point preferably uses additional retaining means in the form of rearwardly extending flanges with a transverse pin extending through them and the tyne. The rearwardly extending flanges can be formed by rolling over the rear end of the share so as to have two downwardly depending flanges. Without the additional retaining means it is found that too much pressure can be expected on the mounting bolt which can break.

The agricultural shares of the present invention may be formed by cutting the required shapes from flat annealed metal sheet. The flanges 24 can be formed by bending the metal when cold. The upwardly curved rear ends of the major faces can also be formed by bending the metal when cold. The two parts 12 and 14 can then be welded together and the resulting ridge 28 hard faced as described. The whole share may then be heat treated and then quenched in known manner.

Modifications and variations such as would be apparent to a skilled addressee are deemed within the scope of the present invention. For example, it should be stressed that while the share of the present invention may be formed from hard metal this is not essential. Thus, the metal of the shares of the present invention may be of a similar hardness to the metal of conventional shares as discussed above.

I claim:

1. An agricultural share formed in two parts wherein said parts are mirror images of one another and each part comprises a major face having a point, said face having a first, inner edge extending rearwardly from the point and a second, outer edge extending rearwardly from the point and diverging at an acute angle away from the first edge, an upstanding flange disposed at an angle greater than 90° to the major face, extending along at least part of the first edge and extending forwardly at least as far as the point, and a respective open faced aperture in said inner edge of each part, said parts being joined together along their inner edges with the flanges on the respective edges abutting each other and forming a ridge between the major faces, an appropriate joining means joining the flanges, the joining of the inner edges mating the open faced apertures to form a mounting aperture arranged to receive a mounting bolt, said mounting aperture being in alignment with the ridge formed by the joined flanges.

2. An agricultural share according to claim 1, in which the abutted flanges are welded together.

3. An agricultural share according to claim 1, in which the major face of each part is substantially flat.

4. An agricultural share according to claim 3, in which the ridge extends rearwardly to a point forward of and close to the mounting aperture, said ridge being of a height, relative to the major faces of the two parts, greater than that of the mounting aperture to define protective means for an aperture received mounting bolt immediately forward thereof.

5. An agricultural share according to claim 4, including a deposit of hard face material along the formed ridge.

6. An agricultural share according to claim 5, wherein the major faces of the parts curve upwardly from a point rearward of the mounting aperture.

7. An agricultural share according to claim 4, wherein the major faces of the parts curve upwardly from a point rearward of the mounting aperture.

8. An agricultural share according to claim 1 in which the ridge extends rearwardly to a point close to the mounting aperture.

9. An agricultural share according to claim 1, in which the ridge formed by the joined flanges extends forwardly of the share to form a nose.

10. An agricultural share according to claim 9, in which the nose extends forwardly to an extent such as to form a chisel point.

11. An agricultural share according to claim 1, in which the upper face of the ridge formed by the joined flanges has deposited thereon hard face material.

12. An agricultural share according to claim 1, in which there is provided a rearwardly facing open ended aperture arranged to engage in use with a tyne to which the share is mounted.

* * * * *